US008402196B2

(12) United States Patent
Davis et al.

(10) Patent No.: US 8,402,196 B2
(45) Date of Patent: Mar. 19, 2013

(54) STORAGE ASSEMBLY, A PHYSICAL EXPANDER AND A METHOD

(75) Inventors: David M. Davis, Portsmouth (GB); Neil A. Edmunds, Ringwood (GB); Timothy P. E. Williams, Havant (GB); Alan J. Westbury, Havant (GB)

(73) Assignee: Xyratex Technology Limited, Havant (GB)

( * ) Notice: Subject to any disclaimer, the term of this patent is extended or adjusted under 35 U.S.C. 154(b) by 241 days.

(21) Appl. No.: 12/717,531

(22) Filed: Mar. 4, 2010

(65) Prior Publication Data

US 2011/0219158 A1 Sep. 8, 2011

(51) Int. Cl.
*G06F 13/36* (2006.01)
(52) U.S. Cl. .......................... 710/313; 710/311; 710/300
(58) Field of Classification Search .................... 710/300
See application file for complete search history.

(56) References Cited

U.S. PATENT DOCUMENTS

| | | | | |
|---|---|---|---|---|
| 6,148,352 | A * | 11/2000 | Coale et al. .................... 710/100 |
| 6,701,411 | B2 * | 3/2004 | Matsunami et al. ........... 711/114 |
| 6,850,410 | B2 * | 2/2005 | Peeke et al. ............. 361/679.32 |
| 6,853,546 | B2 * | 2/2005 | Rabinovitz ............... 361/679.02 |
| 6,928,509 | B2 * | 8/2005 | Surugucchi .................... 710/316 |
| 7,068,500 | B1 * | 6/2006 | Beinor et al. ............ 361/679.33 |
| 7,360,010 | B2 * | 4/2008 | Ghaffari et al. ................ 710/316 |
| 7,548,975 | B2 * | 6/2009 | Kumar et al. .................. 709/226 |
| 7,624,223 | B2 * | 11/2009 | Clegg et al. .................... 710/316 |
| 7,668,925 | B1 * | 2/2010 | Liao et al. ...................... 709/212 |
| 7,739,432 | B1 * | 6/2010 | Shaw et al. ...................... 710/74 |
| 7,882,509 | B2 * | 2/2011 | Jones et al. ..................... 719/326 |
| 7,958,293 | B2 * | 6/2011 | Bakke et al. .................... 710/74 |
| 7,983,032 | B2 * | 7/2011 | Walker et al. ............ 361/679.33 |
| 2004/0162926 | A1 * | 8/2004 | Levy ............................... 710/74 |
| 2004/0252672 | A1 * | 12/2004 | Nemazie ....................... 370/351 |
| 2004/0252716 | A1 * | 12/2004 | Nemazie ....................... 370/447 |
| 2007/0069057 | A1 * | 3/2007 | Gasser .......................... 242/245 |
| 2007/0165660 | A1 * | 7/2007 | Fang et al. ..................... 370/410 |
| 2008/0126631 | A1 * | 5/2008 | Bailey et al. ................... 710/74 |
| 2008/0162773 | A1 * | 7/2008 | Clegg et al. ................... 710/316 |
| 2009/0007154 | A1 | 1/2009 | Jones ............................ 719/326 |
| 2009/0007155 | A1 * | 1/2009 | Jones et al. ................... 719/327 |
| 2009/0273896 | A1 * | 11/2009 | Walker et al. ............ 361/679.33 |
| 2009/0327537 | A1 * | 12/2009 | Bakke et al. .................... 710/74 |

FOREIGN PATENT DOCUMENTS

EP 1796003 A2 * 6/2007

* cited by examiner

*Primary Examiner* — Ryan Stiglic
(74) *Attorney, Agent, or Firm* — Pillsbury Winthrop Shaw Pittman LLP

(57) ABSTRACT

A storage assembly includes a physical expander for connection in use to two or more SCSI initiators, and two or more storage devices, wherein the expander is controlled such that it presents plural virtual expanders. A method for connecting two or more storage devices to two or more SCSI initiators within a storage assembly, includes providing a physical expander for connection in use to the two or more SCSI initiators, and two or more storage devices, and controlling the single expander such that it presents plural virtual expanders.

19 Claims, 6 Drawing Sheets

STORAGE ASSEMBLY, A PHYSICAL EXPANDER AND A METHOD

The present invention relates to a storage assembly, a physical expander and a method for connecting two or more storage devices to two or more SCSI initiators within a storage assembly.

In particular embodiments, the invention relates to a storage assembly that operates in accordance with the Small Computer System Interface (SCSI) standards and in particular the Serial Attached SCSI also known as SAS.

Typically, in data transfer technology, SAS moves data to and from computer storage devices such as hard disk drives and tape drives. It uses a private switched network and a serial protocol that replaces the parallel SCSI bus technology.

Within a SAS system, an "initiator" is a device that originates service and task-management requests for processing by a target device and receives responses for the same requests from those target devices. Initiators may be provided as an on-board component on a motherboard (as in the case with many server-oriented motherboards) or as an add-on host bus adapter. A "target" device is a device containing logical units and target ports that receives service and task management requests for processing from an initiator and sends responses for the same requests to initiator devices. Examples of target devices are: a hard disk, a solid state disk or a disk array system. A "Service Delivery Subsystem" is part of an I/O system that transports information between an initiator and a target. Typically, the cables connecting a SCSI initiator and SCSI target with or without expanders and backplanes constitute a service delivery subsystem.

An SAS "domain" is defined as that which contains two or more SAS devices and a service delivery subsystem. Typically a storage assembly, comprises one or more SCSI Initiators, associated with one or more SAS or SATA storage devices connected using a service delivery subsystem.

An expander is usually provided. A Serial Attached SCSI Expander (SAS Expander) facilitates communication between plural SAS devices. Expanders contain two or more external expander-ports. An expander is not necessary to interface a SAS initiator and target but allows a single initiator to communicate with more SAS/SATA targets. In other words, a SAS expander can be generally described as a switch that allows initiators and targets to communicate with each other, and allows additional initiators and targets to be added to the system. As an analogy, an expander is like a network switch in a network which allows multiple systems to be connected using a single switch port.

FIG. 1 shows a schematic representation of a storage assembly. The storage assembly 2 provides for connectivity from two independent SCSI Initiators 4 and 6. Each of the SCSI Initiators 4 and 6 is connected to a controller module, labelled respectively controller 1 and controller 2 which may contain one or more SAS expanders. A midplane 8 is provided to which each of the controller modules is connected. A single dual ported storage device 10, which may be a hard disk drive or other such storage device, is provided. Each of the SCSI Initiators 4 and 6 exists within its own independent SAS domain. The storage device 10 has two Target ports 12 and 14, each of which, in the example shown, is connected via the midplane 8 to a respective one of the SAS domains. A dual ported storage device may be a dual ported SAS device, a SATA device equipped with an active/Active multiplexer or a SATA device equipped with a SAS to SATA bridge device. The storage device 10 is provided on a sled or carrier 11 which enables it to be easily connected to and disconnected from the SCSI Initiators (via the midplane 8).

Typically, the dual ported storage device 10 is part of a group of such devices which form a storage subsystem. FIG. 2 shows an example of a subsystem similar to that of FIG. 1, except three storage devices 10 are shown connected to the midplane 8.

Such a storage subsystem is required to provide data communications for instance using the Serial Attached SCSI protocol via a mid-plane with multiple storage devices on a removable sled or carrier.

Where the removable sled or carrier accommodates only a single storage device (as in FIGS. 1 and 2), the device is typically mated directly to the midplane via a connector system capable of carrying the necessary high speed signals to enable the transfer of data to and from the storage device. Normally the sled only provides a mechanism to hold the storage device in the enclosure. It is still the storage device that mates with the midplane. This is true for direct dock SAS and SATA. If a dual path connection is needed for SATA, then there is an interposer PCB and silicon that is mounted on the sled and connects to the storage device. Then the sled and interposer connect to the midplane. Extending the capacity of the sled to support multiple storage devices typically requires the provision of additional pins or high speed signal paths on the midplane connector or a high speed switching component on the sled. Examples of switching systems that may be provided on the sled include SAS expanders or SATA (Serial Advanced Technology Attachment) port multipliers.

There are problems associated with both the provision of additional pins on the midplane connector and with the use of a high speed switching component on the sled.

Where additional high speed signal paths are provided via the midplane connector, this would require the provision of a modified sled with additional high speed wiring and a specific connector interface which is different from the normally used interface. If such hardware modifications were made, this would then prevent a single storage device being plugged in directly to the midplane as is currently done. It would also be expensive as it would necessitate the additional cost and development of a midplane and input/output module capable of communicating with an increased number of storage devices.

The use of a switching component is problematic particularly in High Availability (HA) enclosures. In such cases, two switching components are normally required, one for each of the independent domains to provide redundancy. Therefore, such an arrangement is necessarily complex and expensive due to the fact that at least 2 expanders or switches are required. An example of such a system is shown schematically in FIG. 3, where two expanders 16 and 18 are provided in the sled 11. Each of the expanders 16 and 18 is coupled via various of its physical ports (Phys) to each of the three storage devices 10.

To reduce the complexity and expense, mentioned above, associated with the provision of at least 2 expanders or switches, one proposed approach is to use partitioning so as to permit a single switching component to be utilised. Where a SAS expander is to be used, various "zoning" mechanisms have been implemented by expander vendors and manufacturers such as LSI Logic, PMC Sierra, Maxim Integrated Products and Marvell Semiconductor. There are also zoning techniques defined in the SAS 2 standard. SAS zoning is implemented by a set of zoning expander devices with zoning enabled that define a zoned portion of a service delivery subsystem (ZPSDS). The zoning expander devices control whether a "Phy" is permitted to participate in a connection to another "Phy" based on a zone permission table. A copy of this table is maintained in each of the zoning expanders.

US-A-2009/0007154 discloses a method and system for the "simplification" of the re-discovery process for initiators due to changes in a network including one or more SAS expanders.

According to a first aspect of the present invention, there is provided a storage assembly, comprising: a midplane for connection to one or more SCSI Initiators; a physical expander connected to the midplane for connection to two or more storage devices, wherein the expander is controlled such that it presents plural virtual expanders each for connecting one or more storage devices to a respective one of the two or more SCSI Initiators. Preferably, each of the virtual expanders is in a different SAS domain.

In an embodiment, the limitations of known systems are overcome by the division of a single physical SAS expander into two or more virtual expanders. The virtual expanders can exist in separate SAS Service Delivery Subsystems or SAS domains.

Preferably, the system comprises a carrier or sled on which is provided the physical expander.

The system enables a single physical SAS expander to be made to present a plurality of virtual SAS expanders that can exist in separate SAS domains. Importantly, no SAS system outside of the multidrive sled is needed to perform any non standard function. Two virtual expanders are presented by the single expander and the virtual expanders are perceived by the rest of the system simply to be two independent physical SAS expanders. Importantly, the use of an external zone manager is not required. Additionally no administrative, static or dynamic configuration of the SCSI Initiator is required.

The system enables increased functionality as described above whilst providing a reduced cost of parts. Significant cost reduction is provided for every drive sled. The cumulative cost benefit across a storage subsystem could be substantial.

Since fewer physical components are used for a given expander functionality, there is a reduced power requirement as compared to the situation if a larger number of physical expanders were provided. The system provides potential for significant power reduction on every drive sled and accordingly, the cumulative power reduction benefit across a storage subsystem could be substantial. Providing the same functionality with reduced components also leads to a reduction in PCB space requirement.

In an embodiment, the system comprises plural dual port storage devices, the ports of the storage devices being connected to selected physical ports of the physical expander in accordance with configuration of the physical expander such that each storage device port perceives connection to a different SAS domain.

Preferably, firmware is embedded within the physical expander to control the expander to function as two or more virtual expanders.

Preferably, the physical expander includes a routing table configured such that devices perceive the physical expander as two or more physical expanders.

In an embodiment, the routing table is maintained in real time, e.g. by use of the SAS BROADCAST (CHANGE) primitive.

In one embodiment, when a change in topology occurs, all expanders within the system work collectively to propagate details of the change to end devices.

Preferably, the physical ports on the physical expander are virtualised to present to connected devices two or more sets of virtual physical ports.

In a preferred embodiment, the storage system comprises two or more storage devices such as hard disk drives of any appropriate size arranged on the sled connected to the physical expander. The sled is then connected to the midplane such that the use of a single physical expander on the sled enables plural disk drives to be provided in the footprint usually only required for a single disk drive. Disk drive density can therefore be increased significantly without sacrificing function. For 3.5 in disk drives in accordance with SFF-8301/SFF-8323 external dimensions are typically 146 mm long×101.6 mm wide. 2.5 in disk drives to SFF-8201/SFF-8223, external dimensions are typically 100 mm long×70 mm wide. Thus, if rotated through 90 deg two 2.5 in drives fit within the footprint of a single 3.5 in disk drive. Typically, it might be 2×3.5 in drives that would be used in an extended length carrier, or 4×2.5 in disk drives.

According to a second aspect of the present invention, there is provided a physical expander for arrangement within a storage assembly and for connection in use to two or more SCSI initiators and two or more storage devices, wherein the expander is controlled or controllable such that it presents plural virtual expanders.

According to a third aspect of the present invention, there is provided a method for connecting two or more storage devices to two or more SCSI initiators within a storage assembly, the method comprising: providing a physical expander for connection in use to the two or more SCSI initiators, and two or more storage devices, and controlling the single expander such that it presents plural virtual expanders.

In one aspect there is provided a storage assembly, comprising: a midplane for connection to one or more hosts each defining a separate SAS domain; an expander connected to the midplane for connection to two or more storage media, wherein the expander is controlled such that it presents plural virtual expanders in different SAS domains for connection to the separate SAS domains of the hosts.

According to a further aspect of the present invention, there is provided a sled for use in a storage assembly, the sled comprising: a carrier arranged to carry plural disk drives; and a physical expander for connection in use to two or more SCSI initiators and two or more storage devices provided in use on the carrier, wherein the expander is controlled or controllable such that it presents plural virtual expanders.

Embodiments of the present invention will now be described by way of example with reference to the accompanying drawings, in which.

In a storage system described herein, the use of a single connector, such as described in SFF-8482, which is intended for a single dual ported storage device, is extended to allow multiple dual ported storage devices to be connected. This is achieved with the use of a single expander configured to present two or more virtual expanders to connected devices. In the specific non-limiting example of a SCSI storage system, a SAS Expander device, with custom firmware, is arranged so as to allow the appearance of multiple SAS expanders. Using a SAS Expander with its standard functions will not allow this connectivity. The connectivity provided herein is shown in and described with reference to FIG. 4. In this example, the connectivity from 2 SCSI Initiators is shown. Preferably each of the SCSI Initiators is in a separate SAS domain and is connected to multiple dual ported storage devices via a conventional unmodified midplane.

A single physical SAS expander is "divided" into, or configured to function as, two or more virtual expanders. These virtual expanders can exist in separate SAS Service Delivery Subsystems or SAS Domains. Preferably, the storage system solves the problem of connecting multiple dual ported SAS storage devices via a single SAS backplane connector to multiple SCSI Initiators using a single SAS expander, although it may also have more general application. In other words the connectivity that would typically be provided to enable connection between a single dual ported storage device and a midplane, can be made to function in such a way as to enable plural such storage devices to be connected without modification. This is achieved by the "virtualisation" of plural expanders from a single physical component.

Figure 1:
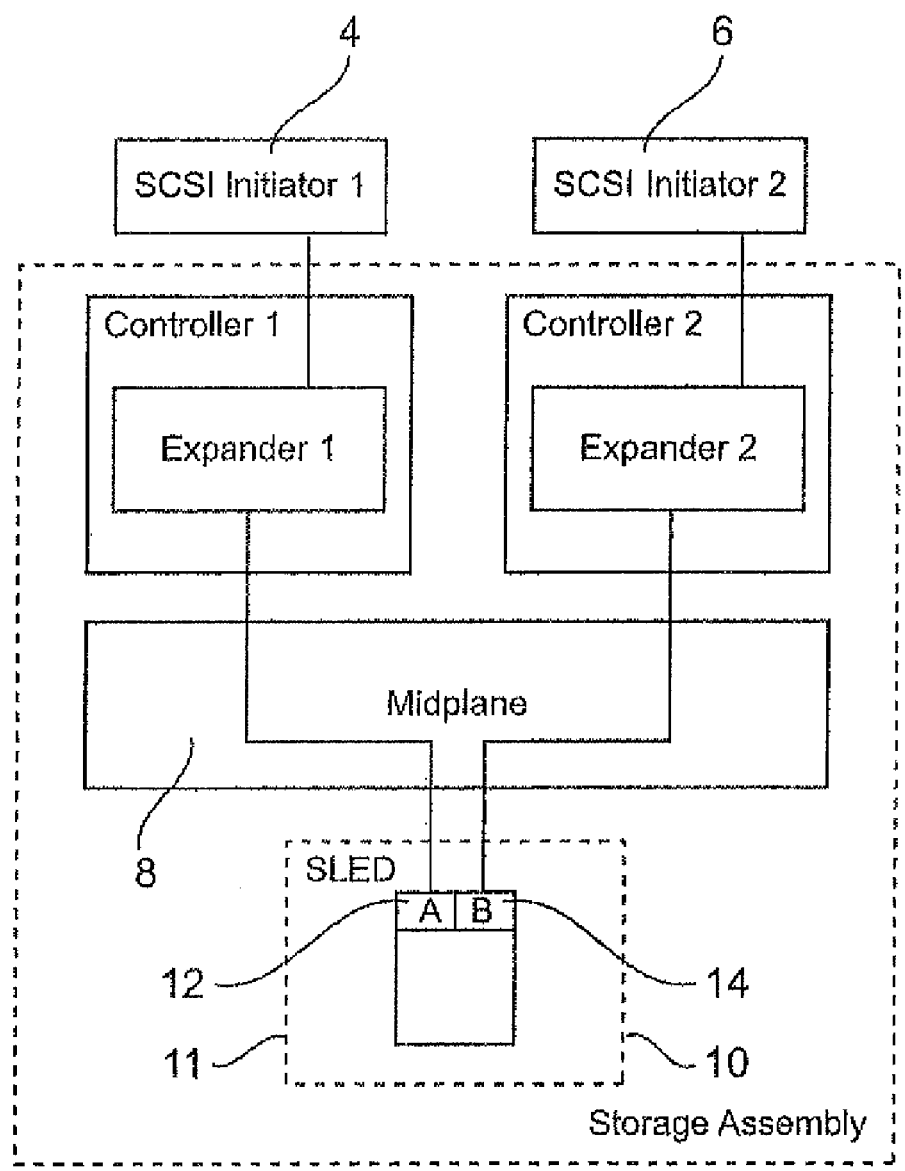
FIGS. 1 to 4 are schematic representations of a storage assembly.
Figure 3:
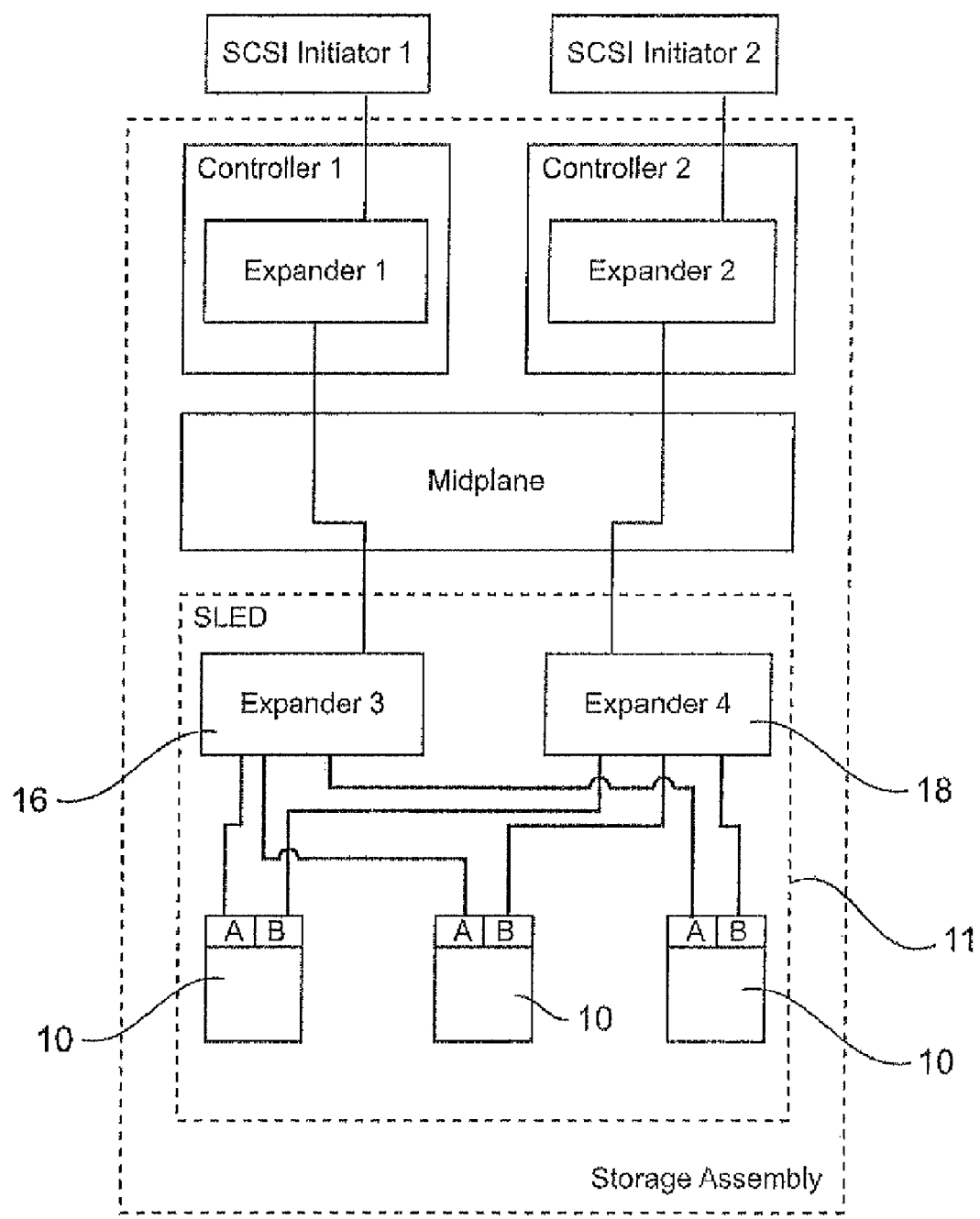
Figure 4:
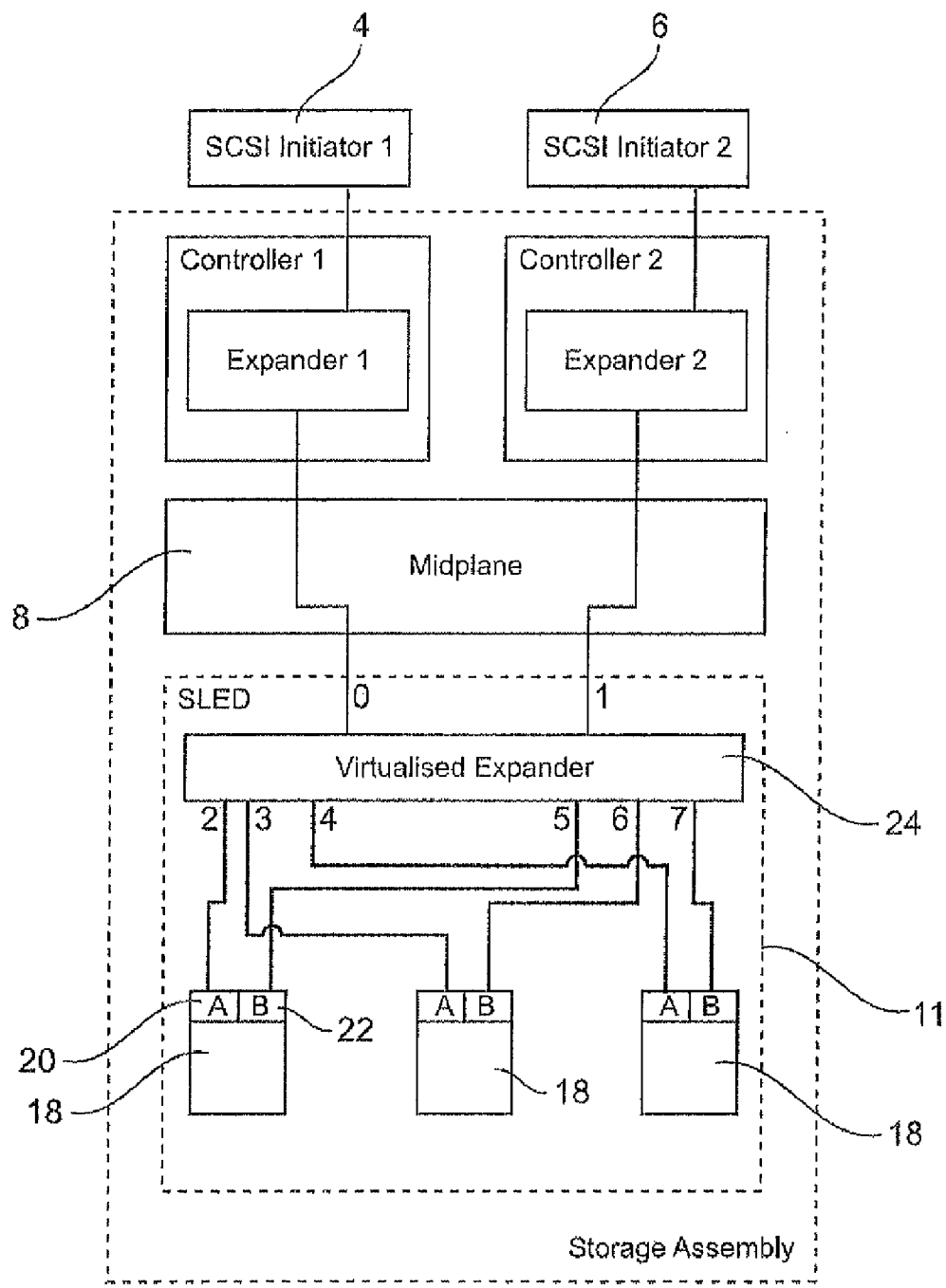

FIG. 4 is a schematic representation of a storage assembly. As in the example of FIGS. 1 to 3, the storage assembly 16 provides for connectivity from two independent SCSI Initiators 4 and 6. A midplane 8 is provided to which each of the SCSI Initiators 4 and 6 is physically connected. In this case, via the same connectivity as provided between the midplane 8 and the storage device 10 of FIG. 1, plural dual ported storage devices 18, which may be hard disk drives or other such storage devices, are provided. Each of the SCSI Initiators 4 and 6 is part of an independent SAS domain. Each of the storage devices 18 has two ports 20 and 22, each of which, in the example shown, is connected via the midplane 8 to a respective one of the SAS domains.

An expander 24 (in this example, a SAS expander) is provided connected to the midplane 8. In this example the expander 24 has 8 physical ports, numbered 0 to 7. The number of additional storage devices that can be connected to the SAS Expander 24 is only limited by the number of SAS PHYs available on the Expander 24. In this example, as the Expander 24 is an 8 PHY device, this enables up to 3 dual ported storage devices 18 to be connected to the SCSI Initiators 4 and 6.

As will be explained below, using this SAS Expander with custom firmware, more than 1 virtual expander is presented from a single physical device. Whereas multiple separate physical expanders could be used for each expander (as in the example of FIG. 3), in the present system, a single physical expander may be used to provide the functionality of plural expanders, thus reducing the burden on cost, power requirement, and board space. The examples discussed below are based on two virtual expanders being represented by a single physical expander device.

SAS Standard Revision Levels

Over the course of evolution of the SAS technology there have been several key points at which revisions of the SAS standard have become formally ratified by ANSI (American National Standards Institute). The formal standard revisions that are considered here are:

SAS 1.1 (ANSI/INCITS 417-2006); and,
SAS-2 (INCITS 457 Draft 2)

The SAS-2 standard added, extended and modified SMP functions from their definition in SAS 1.1. The differences between the two standards are referred to here where they are relevant to embodiments of the present invention.

In embodiments of the present invention, changes are required to the standard SAS 1.1 and SAS 2 technologies. These changes are required so that a single physical expander, which would conventionally operate entirely in accordance with one or more of the SAS standards, can now operate as two or more virtual expanders.

Identification Sequence Modification

SAS link initialisation consists of "Link Reset" and "Identification" sequences. The purpose of the "Identification Sequence" is to permit the SAS devices connected by a physical link to exchange basic identity and capability information which is used in subsequent discovery and configuration of the SAS Domain.

When a single physical expander is operating as multiple virtual expanders the expander firmware may manipulate the Identification Sequence in a non-standard manner.

The Identification Sequence consists of the unsolicited transmission of an "Identify" Address Frame via each device Phy whose attached link has just completed a Link Reset Sequence.

A SAS device compliant with the SAS 1.1 standard transmits a single Identify Address Frame. A SAS device compliant with the SAS-2 standard may transmit three consecutive Identify Address Frames.

Device Name

A field in the Identify Address Frame carries the 64 bit SAS Address of the SMP Target that a SAS Expander is required to implement. A SAS Expander device compliant with the SAS 1.1 or SAS-2 standard implements a single SMP target. When an Identify Address Frame is required to be sent then the same SAS Address shall be used in that frame for each Phy contained within the expander.

When a single physical SAS Expander is operating as multiple Virtual (SAS) Expanders (VE) then a separate SAS Address (VE SAS Address) may be used for each Virtual Expander. Each of the Phys associated with the Virtual Expander may use this VE SAS address specific to the Virtual Expander in the IDENTIFY address frame when required. This gives the external impression of multiple SMP Targets contained within a single physical expander, one for each of the Virtual Expanders instantiated.

The "SAS Address" field that may be populated with the "VE SAS Address" is shown in bytes 12 to 19 of Table 1. Although Table 1 shows a SAS-2 format IDENTIFY address frame, SAS 1.1 format IDENTIFY address frames carry the identical field.

Phy Identifier

Each Phy in a single physical SAS expander has a Phy Identifier. Phy Identifiers start at zero and increment by one for each physical and embedded virtual Phy present in the expander. The Phy Identifier is contained in byte 20 of the IDENTIFY address frame shown in Table 1.

When a single physical SAS Expander is operating as multiple Virtual SAS Expanders then each Virtual SAS expander may enumerate its associated physical Phys using a Virtual Expander Phy Identifier, VE Phy Identifier, which starts at zero and increments by one for each Phy in the virtual expander for each instantiation of virtual expander.

TABLE 1

IDENTIFY address frame format

| Byte/Bit | 7 | 6 | 5 | 4 | 3 | 2 | 1 | 0 |
|---|---|---|---|---|---|---|---|---|
| 0 | Reserved | DEVICE TYPE | | | ADDRESS FRAME TYPE (0 h) | | | |
| 1 | REASON | | | | | | | |
| 2 | Reserved | | | | SSP INITIATIOR | STP INITIATIOR | SMP INITIATIOR | Restricted |
| 3 | Reserved | | | | SSP TARGET | STP TARGET | SMP TARGET | Restricted |
| 4 ⇓ 11 | DEVICE NAME | | | | | | | |
| 12 ⇓ 19 | >>>>>SAS ADDRESS ⟶ VE SAS ADDRESS<<<<< | | | | | | | |
| 20 | >>>>>PHY IDENTIIFIER ⟶ VE PHY IDENTIFIER<<<<< | | | | | | | |
| 21 | Reserved | | | | INSIDE ZPSDS PERSISTENT | REQUESTED INSIDE ZPSDS | BREAK REPLY CAPABLE | |
| 22 ⇓ 27 | Reserved | | | | | | | |
| 28 ⇓ 31 | CRC | | | | | | | |

The same modification may be performed on IDENTIFY address frames for SAS 1.1 and SAS-2 environments SMP Function Manipulation Discovery and management of a SAS Domain uses a set of standard defined SAS Management Protocol (SMP) Function requests and responses. These SMP functions are sent by SMP Initiators to SMP Targets. A SAS Expander device is required to implement SMP Target functionality. In order that a single physical expander can give the outward impression of being multiple Virtual Expanders SMP functions may be manipulated by firmware running in the expander in a non-standard manner.

The SMP Function response fields that may be modified are as follows:

Expander Change Count

A SAS expander is required to maintain a value referred to as "Expander Change Count". This count is incremented whenever an expander Phy changes state, i.e. undergoes a loss of synchronisation, or is explicitly disabled or enabled. In a SAS standard compliant expander this count represents the sum of all state changes of all Phys within that expander. When a single physical SAS Expander is operating as multiple Virtual SAS Expanders then a separate Expander Change Count, VE Expander Change Count, must be maintained for each Virtual Expander instantiated.

The VE Expander Change Count maintained and stored or filed may be used in all SMP function responses that require that this information is returned.

Number of Phys

An expander compliant with the ANSI SAS standards reports "Number of Phys" based on the total number of physical and embedded virtual SAS phys present in the device. When a single physical SAS Expander is operating as multiple Virtual SAS Expanders, then the "Number of Phys" field shall be modified to "VE Number of Phys" and shall represent the number of physical phys and virtual phys, if any, associated with the virtual expander to which the SMP function request is addressed.

Configurable Route table

When a single physical SAS Expander is operating as multiple Virtual SAS Expanders, then the "Configurable routetable" field, (byte 10, bit 0) shall be set to 0b.

Expander Route Indexes

When a single physical SAS Expander is operating as multiple Virtual SAS Expanders, then the "Expander Route Indexes" field, (bytes 6 & 7) shall be set to 0000 h.

TABLE 2

Report General SMP Function Response (SAS 1.1)

| Byte/Bit | 7 | 6 | 5 | 4 | 3 | 2 | 1 | 0 |
|---|---|---|---|---|---|---|---|---|
| 0 | SMP Frame Type (0x41) | | | | | | | |
| 1 | Function (0x00) | | | | | | | |
| 2 | Function Result | | | | | | | |
| 3 | Reserved | | | | | | | |
| 4 – 5 | >>>>> Expander Change Count → VE Expander Change Count <<<<< | | | | | | | |
| 6 – 7 | Expander Route Indexes | | | | | | | |
| 8 | Reserved | | | | | | | |
| 9 | >>>>> Number of Phys → VE Number of Phys <<<<< | | | | | | | |
| 10 | Reserved | | | | | | CONFIGURING | CONFIGURING ROUTE TABLE |
| 11 – 27 | Reserved | | | | | | | |
| 28 – 31 | CRC | | | | | | | |

The format of the SAS-2 Report General SMP function is significantly extended from the SAS 1.1 format. However the fields to be modified and the byte positions of those fields is identical to SAS 1.1 shown in Table 2.

SMP Report General is the only SMP function for SAS 1.1 compliant expanders that reports Expander Change Count.

The ANSI SAS-2 Standard introduced additional SMP functions and also modified those originally defined in SAS 1.1. The key SMP modification relevant to embodiments and examples of the present invention made by SAS-2 is the addition of "Expander Change Count" field (discussed above) to many SMP function response fields. When a single physical SAS Expander is operating as multiple Virtual SAS Expanders it may report VE Expander Change Count in place of the standard defined Expander Change Count whenever an affected SMP function response is required. The SAS-2 SMP function that use this value are listed in Table 3 below:

TABLE 3

SAS-2 SMP Functions with Expander Change Count field

| SMP Function | Function Code |
|---|---|
| Report General | 0x00 |
| Report Manufacturing Information | 0x01 |
| Report Self-configuration Status | 0x03 |
| Report Zone Permission Table | 0x04 |
| Report Zone Manager Password | 0x05 |
| Report Broadcast | 0x06 |
| Discover | 0x10 |
| Report Phy Error Log | 0x11 |
| Report Phy SATA | 0x12 |
| Report Route Information | 0x13 |
| Report Phy Event | 0x14 |
| Discover List | 0x20 |
| Report Phy Event List | 0x21 |
| Report Expander Route Table List | 0x22 |

Routing Attributes

A non-standard handling of an SMP Discover response is required. A physical expander operating as multiple virtual expanders must give the external impression of a port with the subtractive routing attribute for each virtual expander instantiated. Since the SAS standards permit only one port per physical expander to use the subtractive routing method, each virtual expander must use the table routing method. However, in order to preserve the correct external impression, all SMP Discover responses, for PHYs connecting to upstream expanders, shall indicate the subtractive routing attribute in byte 44 as indicated in table 4 below.

TABLE 4

SAS 1.1 SMP Discover Response Routing Attribute

| Byte/Bit | 7 | 6 | 5 | 4 | 3 | 2 | 1 | 0 |
|---|---|---|---|---|---|---|---|---|
| 0 | SMP Frame Type (41 h) | | | | | | | |
| 1 | Function (10 h) | | | | | | | |
| 2 | FUNCTION RESULT | | | | | | | |
| 3 ⇓ 8 | Reserved | | | | | | | |
| 9 | >>>>> VE PHY IDENTIFIER <<<<< | | | | | | | |
| 10 ⇓ 11 | Reserved | | | | | | | |
| 12 | Reserved | Attached Device Type | | Reserved | | | | |
| 13 | Reserved | | | Negotiated Physical Link Rate | | | | |
| 14 | Reserved | | | | ATTACHED SSP INITIATOR | ATTACHED STP INITIATOR | ATTACHED SMP INITIATOR | ATTACHED SATA HOST |
| 15 | ATTACHED SATA PORT SELECTOR | Reserved | | | ATTACHED SSP TARGET | ATTACHED STP TARGET | ATTACHED SMP TARGET | ATTACHED SATA DEVICE |
| 16 ⇓ 23 | SAS ADDRESS | | | | | | | |
| 24 ⇓ 31 | ATTACHED SAS ADDRESS | | | | | | | |
| 32 | ATTACHED PHY IDENTIFIER | | | | | | | |
| 33 ⇓ 39 | Reserved | | | | | | | |
| 40 | PROGRAMMED MINIMUM PHYSICAL LINK RATE | | | | HARDWARE MINIMUM PHYSICAL LINK RATE | | | |
| 41 | PROGRAMMED MAXIMUM PHYSICAL LINK RATE | | | | HARDWARE MAXIMUM PHYSICAL LINK RATE | | | |

TABLE 4-continued

SAS 1.1 SMP Discover Response Routing Attribute

| 42 | PHY CHANGE COUNT | | |
|---|---|---|---|
| 43 | VIRTUAL PHY | Reserved | PARTIAL PATHWAY TIMEOUT VALUE |
| 44 | Reserved | | ROUTING ATTRIBUTE = "SUBTRACTIVE" (1 h) |
| 45 | Reserved | CONNECTOR TYPE | |
| 46 | CONNECTOR ELEMENT INDEX | | |
| 47 | CONNECTOR PHYSICAL LINK | | |
| 48–49 | Reserved | | |
| 50–51 | Vendor specific | | |
| 52–55 | CRC | | |

Expander firmware modifications are provided in the following areas:

1. The method of routing connections back to the upstream expanders (labelled "Expander 1" and "Expander 2" on Controller 1 & 2 in FIG. 2 described above);
2. Modification to various SAS Management Protocol (SMP) responses to present the illusion of two independent expanders. In operation of a SAS system SMP commands and primitives are used to control data flow and configuration. Primitives are typically used for a variety of signaling and handshaking functions, and perform most of the low-level, time-critical functions;
3. Modification to the IDENTIFY address frame (discussed above);
4. Modification of the Broadcast Propagation Processor (BPP) to send BROADCAST events to specific PHYs;
5. The emulation of multiple SMP targets each with its own unique SAS address.

If two physical expanders are used on the sled, each may use subtractive routing via the midplane and back to upstream expanders (on Controllers 1 & 2). This operation is emulated by the virtual expanders, as will be described below.

An expander device is limited to supporting a single subtractive port. The subtractive port is the port via which all connection requests containing a destination SAS Address that is not directly attached or present in the expanders routing table are routed. For performance reasons, expander routing is typically a hardware function, and the scope for modification to routing operations by firmware may be limited. As a single physical expander is arranged to present plural virtual expanders, subtractive routing cannot be used in the standard defined manner. Accordingly, in the present system, both upstream ports are configured to use table routing, and a novel algorithm is used to configure the route table. This operation has to be hidden from the upstream expanders, requiring changes to the SMP responses given by the expander 24.

Changes are required as part of the modified route table configuration scheme.

Customisation to the expander firmware is required to build and maintain the routing table within the Expander device 24. During the SAS discovery process each SMP Initiator will issue a series of SMP commands to the expander's SMP target. Table entries will be made when the expander detects a connection from an SMP Initiator.

To make the table entry, the firmware must have access to the ingress PHY number used by the connection. Firmware must also be able to detect when an Initiator moves between SAS domains (for example through manual re-configuration)

Once the table has been configured in this way, any of the storage devices on the sled will be able to make connections across the expander using the standard table routing method.

Figure 2:
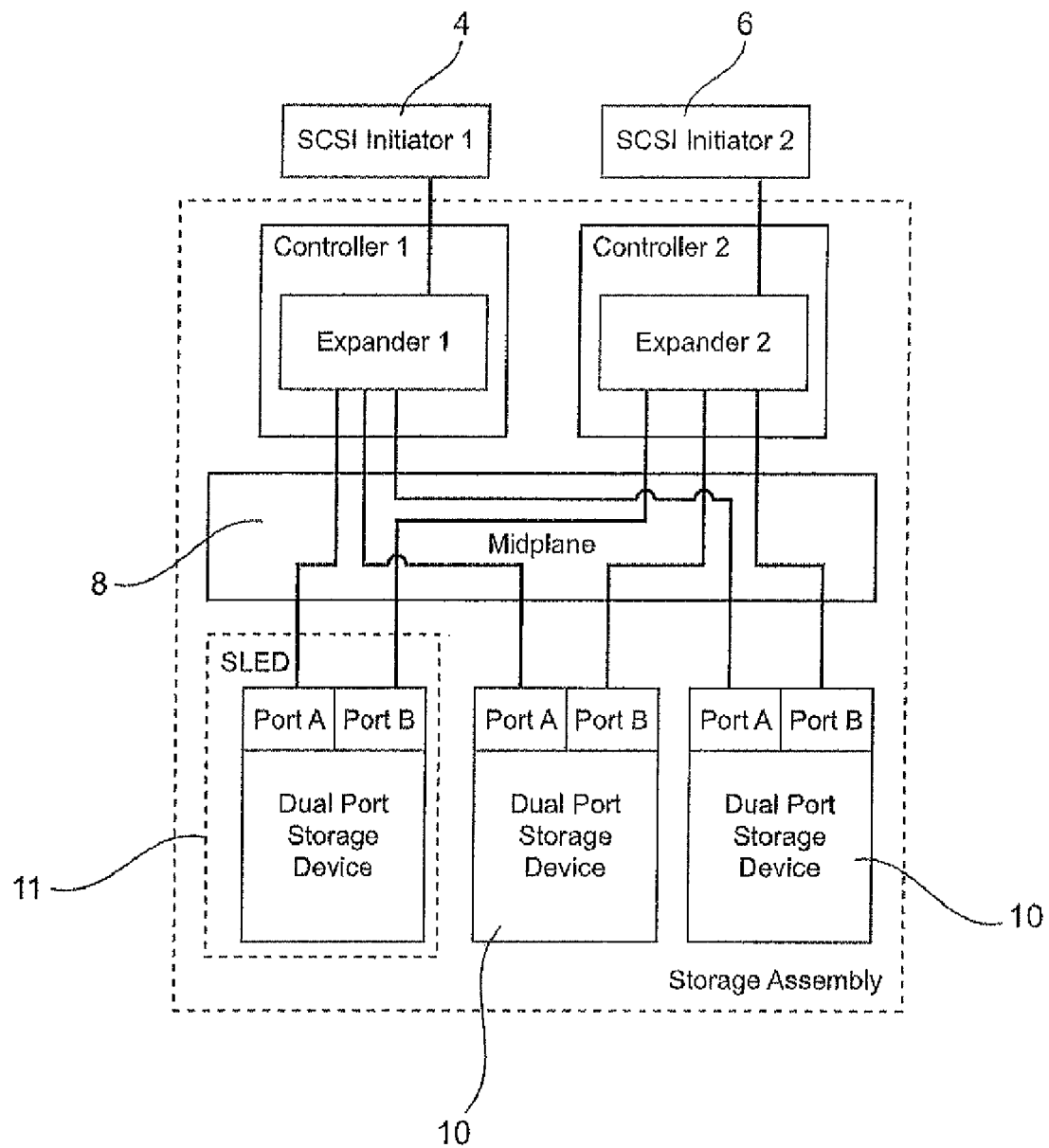

Table 5 below is an example of a route table for an 8 port expander. PHYs 0 and 1 are connected back to the midplane and will each be within a separate SAS domain. PHYs 2, 3, 4, 5, 6 and 7 will be connected to 3 dual ported storage devices (as shown in FIG. 2).

TABLE 5

Example route table

| (Initiator) SAS Address | PHY 0 | PHY 1 | PHY 2 | PHY 3 | PHY 4 | PHY 5 | PHY 6 | PHY 7 |
|---|---|---|---|---|---|---|---|---|
| SAS Address of SCSI Initiator 1 | 1 | 0 | 0 | 0 | 0 | 0 | 0 | 0 |
| SAS Address of SCSI Initiator 2 | 0 | 1 | 0 | 0 | 0 | 0 | 0 | 0 |

"1" indicates that the expander PHY is used for forwarding connection requests, "0" indicates that it is not.

In the example, the discovery process conducted by the two initiators has enabled the expander 24 to construct the route table (table 5). The SAS address field of the route table are determined by examination of the source SAS address contained in the SMP connection requests received by the expander's SMP target. The expander PHY on which these connection requests are received is used to determine the PHY on which the open connection requests from attached storage devices will be forwarded. (As indicated by an entry of "1" in table 5.

The route table is dynamically maintained so as to reflect certain changes in the SAS topology, i.e. the addition or removal of SCSI initiators.

The system described herein, enables a single physical SAS expander to be made to present a plurality of virtual SAS expanders that can exist in separate SAS domains. This is achieved by manipulation of SMP management requests and responses by the SMP Target operating in the physical expander. A novel method of expander route table configuration is provided based on SMP discovery functions received rather than those transmitted.

The system can be implemented in standard SAS hardware. Certain aspects of the SAS protocol that the expander engages in must be made accessible to software. Importantly, no SAS system outside of the multidrive sled is needed to perform any non standard function. The modification of the route table and the like within the expander on the sled enables the rest of the system to remain unaware that there is only a single expander on the sled. Two virtual expanders are presented by the single expander and the virtual expanders are perceived by the rest of the system simply to be two independent physical SAS expanders. Importantly, the use of an external zone manager is not required.

The system enables increased functionality as described above whilst providing a reduced cost of parts. The use of a single physical expander and the manipulation of SMP commands to present plural virtual expanders means, as a consequence, that fewer physical components are required for the same functionality. Thus, significant cost reduction is provided from every drive sled. The cumulative cost benefit across a storage subsystem could be substantial.

Since fewer physical components are used for a given expander functionality, there is a reduced power requirement as compared to the situation if a larger number of physical expanders were provided. The system provides potential for significant power reduction on every drive sled. The cumulative power reduction benefit across a storage subsystem could be substantial. This is very well aligned with general industry requirements for "greener" storage systems and also conveys an additional power cost benefit. Also, in terms of real estate (surface area or footprint to accommodate required devices), on the sled, there is a clear benefit in providing multiple expander functionality from a single physical expander. There is a reduced PCB space requirement.

Figure 4A:
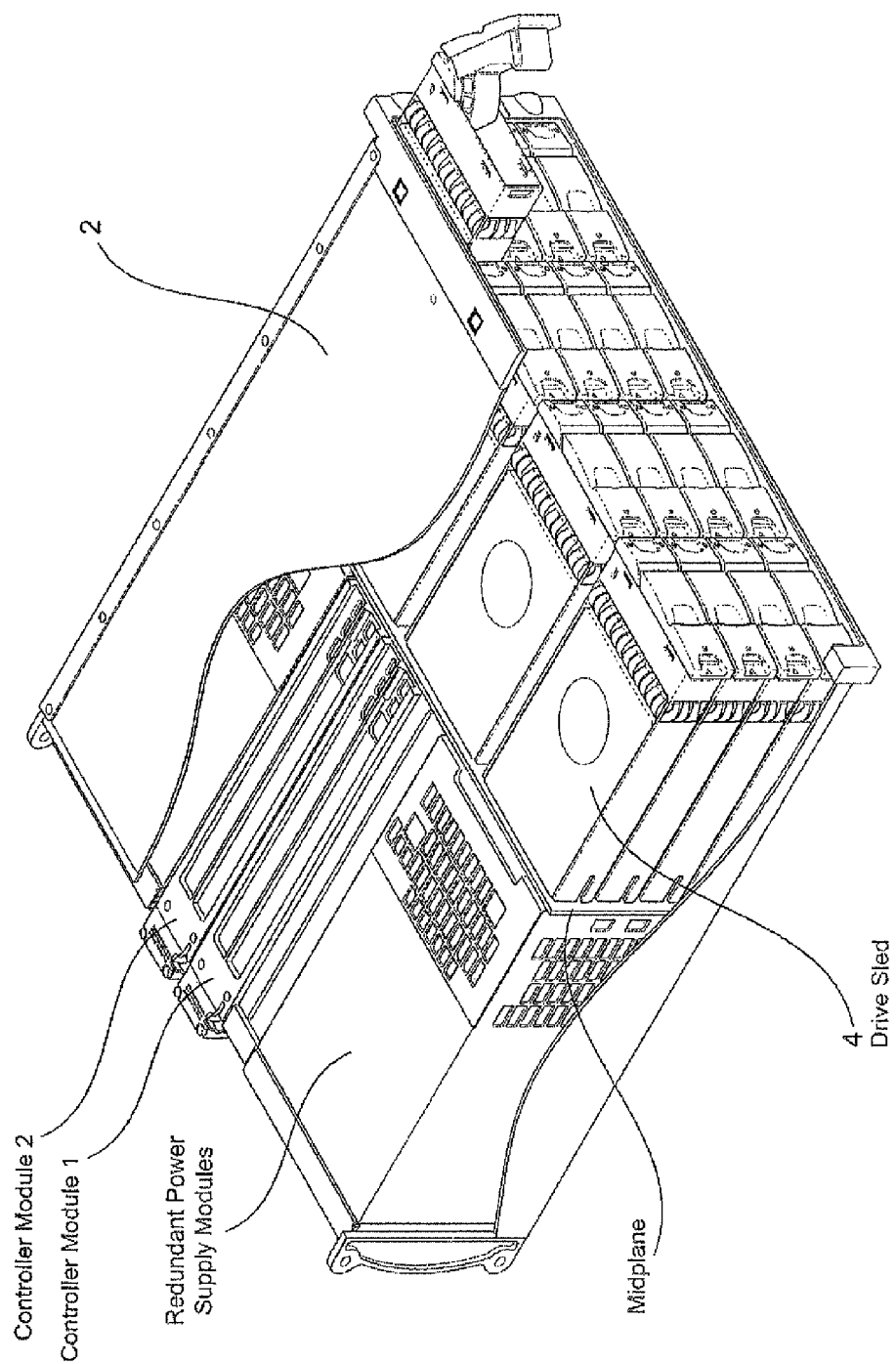
FIG. 4A shows the physical arrangement of a storage assembly.

FIG. 4A shows a schematic representation of a physical storage enclosure arrangement. The arrangement includes a mid-plane and plural disk drive sleds or carriers. A number of EBOD modules are provided together with one or more input/output units. An example of what one of the sleds 4 might comprise is shown in FIG. 5 and described in detail below.

Figure 5:
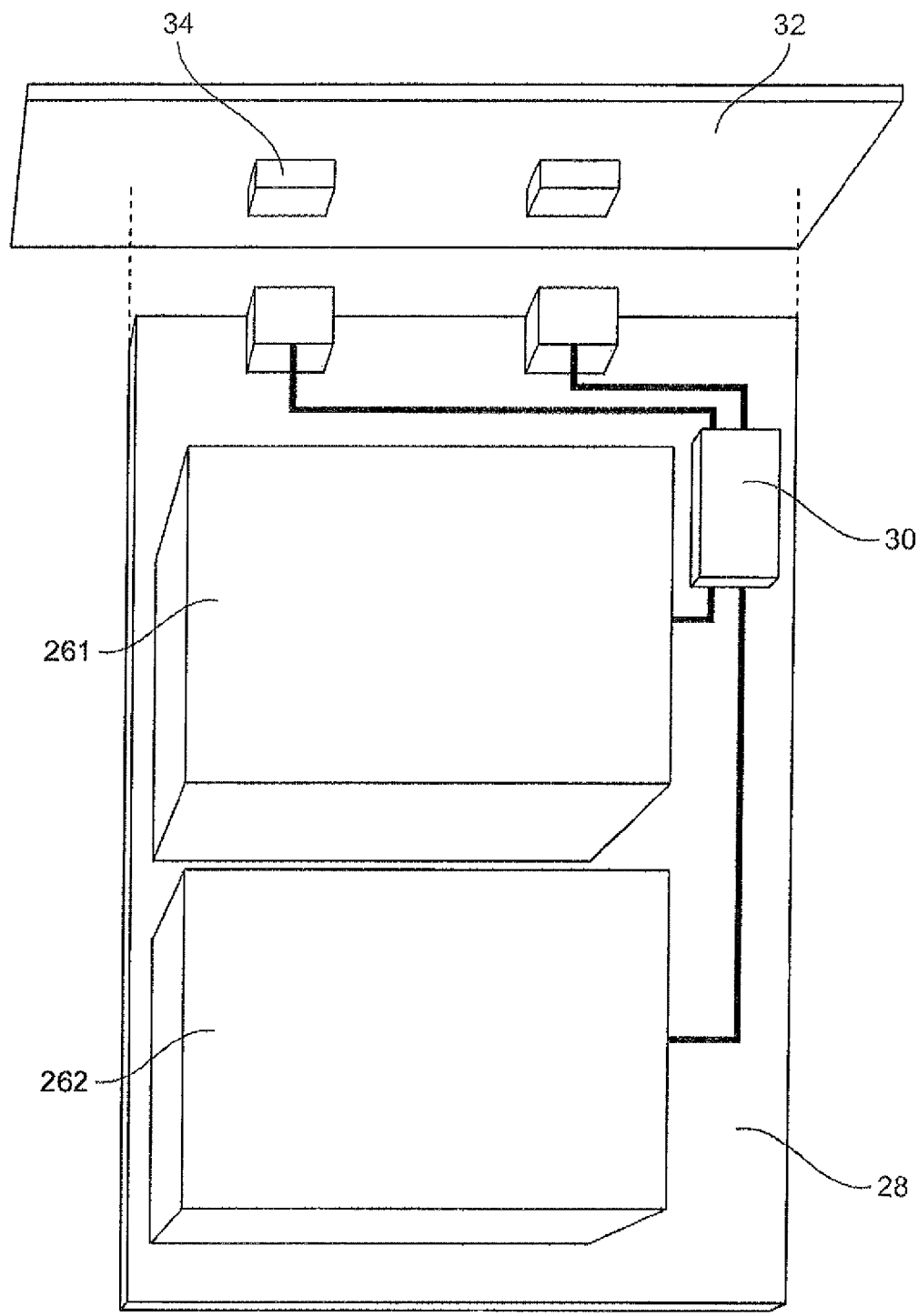
FIG. 5 is a schematic representation of a storage assembly including plural disk drive sleds or carriers.

FIG. 5 is a representation of a storage assembly showing schematically what each of the sleds 4 in FIG. 4A might include. The assembly comprises two hard disk drives $26_1$ and $26_2$ arranged on a sled or carrier 28. A single physical SAS expander 30 is provided on the carrier. Each of the disk drives $26_1$ and $26_2$ are physically connected to the expander 30. The expander includes firmware, not shown, to make it function as two independent expanders, referred to herein as "virtual expanders".

A midplane 32 is shown as part of the storage assembly. A standard connector 34 is provided on the midplane 32 such that the sled connects to the midplane in the same physical way as if there was only a single disk drive on the sled. Since only a single physical expander is provided on the sled the use of real estate or footprint of the sled is relatively limited. Furthermore, the connectivity between the sled and the midplane does not need to be modified as compared to conventional systems in which a single disk is provided on the sled.

Embodiments of the present invention have been described with particular reference to the examples illustrated. However, it will be appreciated that variations and modifications may be made to the examples described within the scope of the present invention.

The invention claimed is:

1. A storage assembly, comprising:
a physical expander for connection in use to two or more SCSI initiators, and two or more storage devices, wherein the expander is controlled such that it presents plural virtual expanders in which the range of physical PHY Identifiers is abstracted to provide multiple ranges of VE PHY Identifiers, each contiguously enumerated from VE PHY Identifier 0.

2. A storage assembly according to claim 1, in which a physical expander is a SAS expander controlled such that it presents plural virtual expanders in different SAS domains.

3. A storage assembly according to claim 1, comprising a carrier on which is provided the physical expander.

4. A storage assembly according to claim 2, comprising plural dual port storage devices, the ports of these devices being connected to selected physical ports of the expander in accordance with configuration of the expander such that each storage device port perceives connection to a different SAS domain.

5. A storage assembly according to claim 1, in which firmware is embedded within the physical expander to control the expander to function as two or more virtual expanders.

6. A storage assembly according to claim 5, in which the expander includes a routing table configured such that it operates as plural virtual routing tables, one for each virtual expander.

7. A storage assembly according to claim 6, in which the expander route table is configured by passive monitoring of SCSI Initiator connection requests.

8. A storage assembly according to claim 7, in which the virtual routing tables are independently maintained in real time to reflect topology changes within a SAS domain.

9. A storage assembly according to claim 8, in which routing operations are conducted so as to emulate the existence of a subtractive port for each virtual expander present.

10. A storage assembly according to claim 1, in which the virtual expander is responsible for restricting the notification of topology changes to the SAS domain in which the virtual expander is operating.

11. A storage assembly according to claim 1, in which the virtual expander change count is separately maintained according to the number of BROADCAST (CHANGE) primitives originated from the virtual expander.

12. A storage assembly according to claim 1, in which the SMP Target of each virtual expander (VE) is identified by a separate unique SAS Address, (VE SAS Address).

13. A storage assembly according to claim 12, in which the IDENTIFY address frame contains the VE SAS Address and the VE PHY Identifier in the SAS address and PHY Identifier fields respectively.

14. A storage assembly according to claim 1, in which the SMP Report General function response contains the VE change count and VE number of PHYs in the Expander change count and number of PHYs fields respectively.

15. A storage assembly according to claim 1 in which any SMP function response containing the expander change count is modified to contain the VE change count.

16. A storage assembly according to claim 1 in which any expected Expander Change Count field in a received SMP function request is compared with the VE change count for the targeted virtual expander.

17. A physical expander for arrangement within a storage assembly and for connection in use to two or more SCSI initiators and two or more storage devices, wherein the expander is controlled or controllable such that it presents plural virtual expanders in which the range of physical PHY Identifiers is abstracted to provide multiple ranges of virtual expander VE PHY Identifiers, each contiguously enumerated from VE PHY Identifier 0.

18. A method for connecting two or more storage devices to two or more SCSI initiators within a storage assembly, the method comprising:
providing a physical expander for connection in use to the two or more SCSI initiators, and two or more storage devices, and
controlling the single expander such that it presents plural virtual expanders in which the range of physical PHY Identifiers is abstracted to provide multiple ranges of VE PHY Identifiers, each contiguously enumerated from VE PHY Identifier 0.

19. A sled for use in a storage assembly, the sled comprising:
a carrier arranged to carry plural disk drives; and
a physical expander for connection in use to two or more SCSI initiators and two or more storage devices provided in use on the carrier, wherein the expander is controlled or controllable such that it presents plural virtual expanders in which the range of physical PHY Identifiers is abstracted to provide multiple ranges of VE PHY Identifiers, each contiguously enumerated from VE PHY Identifier 0.

* * * * *